(12) United States Patent
Bourke (10) Patent No.: US 10,569,196 B2
(45) Date of Patent: Feb. 25, 2020

(54) METHOD AND APPARATUS FOR TREATING A FEED STREAM FOR A FLOTATION DEVICE

(71) Applicant: OUTOTEC (FINLAND) OY, Espoo (FI)

(72) Inventor: Peter Gerard Bourke, Forrestfield (AU)

(73) Assignee: OUTOTEC (FINLAND) OY, Espoo (FI)

( * ) Notice: Subject to any disclaimer, the term of this patent is extended or adjusted under 35 U.S.C. 154(b) by 984 days.

(21) Appl. No.: 14/914,537

(22) PCT Filed: Aug. 28, 2014

(86) PCT No.: PCT/IB2014/064105
§ 371 (c)(1),
(2) Date: Feb. 25, 2016

(87) PCT Pub. No.: WO2015/028958
PCT Pub. Date: Mar. 5, 2015

(65) Prior Publication Data
US 2016/0214036 A1    Jul. 28, 2016

(30) Foreign Application Priority Data

Aug. 28, 2013 (FI) ................................ 20135868

(51) Int. Cl.
*B03D 1/24* (2006.01)
*B01D 21/00* (2006.01)
(Continued)

(52) U.S. Cl.
CPC ....... *B01D 21/0084* (2013.01); *B01D 21/286* (2013.01); *B03D 1/02* (2013.01); *B03D 1/18* (2013.01); *B03D 1/247* (2013.01)

(58) Field of Classification Search
CPC .................... B01D 21/0084; B01D 21/286
See application file for complete search history.

(56) References Cited

U.S. PATENT DOCUMENTS 3,787,316 A      1/1974  Brink et al.
4,417,985 A  *  11/1983  Keane .................. B03B 1/04
                                                      210/221.1
(Continued)

FOREIGN PATENT DOCUMENTS

AU    2012100021 A4 *  2/2012
EP       2450106 A1    5/2012
(Continued)

OTHER PUBLICATIONS

Jordan, C. E. "Rapid Flotation Using a Modified Bubble Injected Hydrocyclone and a Shallow Depth Froth Separator for Improved Flotation Kenetics", Mierals Enginering, vol. 5, No. 10-12, pp. 1239-1257, 1992.*
(Continued)

*Primary Examiner* — Thomas M Lithgow
(74) *Attorney, Agent, or Firm* — Buchanan, Ingersoll & Rooney PC (57) ABSTRACT

Provided are a method and apparatus for treating a feed stream for a flotation device comprising a mechanical agitator in a tank, the feed stream comprising solid particles. The method comprises generating microbubbles in a diluation water stream, mixing the diluation water stream with the feed stream to facilitate attachment of the microbubbles to the solid particles in the feed stream and generate bubbles for attachment to microbubble-attached solid particles, and fluidly connecting the feed stream to the flotation device. The apparatus comprises a feed stream conduit fluidly connected to the flotation device, a diluation water stream conduit fluidly connected to the feed stream conduit for conveying the diluation water stream to the feed stream, and
(Continued)

a microbubble generator connected to the diluation water stream conduit for generating microbubbles in the fluid stream.

28 Claims, 3 Drawing Sheets

(51) Int. Cl.
    *B03D 1/18*           (2006.01)
    *B03D 1/02*           (2006.01)
    *B01D 21/28*         (2006.01)

(56) References Cited

U.S. PATENT DOCUMENTS

| | | | |
|---|---|---|---|
| 4,626,356 A * | 12/1986 | Suzuki | B03D 1/02 |
| | | | 210/705 |
| 4,738,784 A | 4/1988 | Sugihara | |
| 2003/0070992 A1 | 4/2003 | Scherzinger et al. | |
| 2010/0176062 A1 * | 7/2010 | Kanel | B03D 1/24 |
| | | | 210/703 |

FOREIGN PATENT DOCUMENTS

| | | | |
|---|---|---|---|
| GB | 694918 | * | 7/1953 |
| GB | 2058737 A | * | 4/1981 |
| WO | 03/055608 A1 | | 7/2003 |
| WO | WO 2004/082841 A1 | | 9/2004 |
| WO | 2008/139289 A2 | | 11/2008 |
| WO | WO 2012/061897 A1 | | 5/2012 |
| WO | 2015/028717 A1 | | 3/2015 |

OTHER PUBLICATIONS

Jordan, C. E. "Improved Flotation Kinetics by Intense In-Line Agitation". Society for Mining, metallurgy and exploration, Inc. , Preprint No. 91-142, 1991.*
Search Report issued by the Finnish Patent Office in corresponding Finnish Patent Application No. 20135868 dated Jun. 6, 2014 (1 page).
Search Report issued by the Chilean Patent Office in corresponding Chilean Patent Application No. 201600418 dated Apr. 6, 2018 (1 page).
International Search Report (PCT/ISA/210) dated Feb. 4, 2015, by the European Patent Office as the International Searching Authority for International Application No. PCT/IB2014/064105.
Written Opinion (PCT/ISA/237) dated Feb. 4, 2015, by the European Patent Office as the International Searching Authority for International Application No. PCT/FI2014/050639.
International Preliminary Report on Patentability (PCT/IPEA/409) dated Nov. 26, 2015, by the European Patent Office as the International Searching Authority for International Application No. PCT/IB2014/064105.

* cited by examiner

METHOD AND APPARATUS FOR TREATING A FEED STREAM FOR A FLOTATION DEVICE

FIELD OF THE INVENTION

The present invention relates to flotation devices of the type used in mineral separation, especially flotation processes for separating mineral fines from liquid suspensions or pulps. The invention has been developed primarily for use in a skim air flotation cell operating in a grinding circuit, and will be described hereinafter with reference to this application. However, it will be appreciated that the invention is not limited to this particular flotation device and could be adapted for use in other mechanical flotation cells and the like.

BACKGROUND OF THE INVENTION

The following discussion of the prior art is intended to present the invention in an appropriate technical context and allow its significance to be properly appreciated. Unless clearly indicated to the contrary, however, reference to any prior art in the specification should not be construed as an admission that such art is widely known or forms part of the common knowledge in the field.

Conventional flotation devices typically include a tank for receiving and containing slurry from a grinding mill, cyclone separator, or the like. The slurry is typically composed of mineral and other particles in a fluid suspension. The slurry is generally agitated within a tank of the flotation device and an aeration system is used to create air bubbles in the tank. Suitable reagents known as "collector reagents" are also added, which coat the surfaces of the valuable mineral particles within the slurry to make these particles hydrophobic and thereby to preferentially promote bubble to particle attachment. Other chemicals known as "frother reagents" are also added to assist in the formation of fine bubbles and support a stable forth zone at the top of the tank.

As bubbles rise toward the surface of the tank, they carry with them floatable valuable mineral particles, which form a mineral enriched surface froth. The froth then migrates over a lip and into a launder whereby the valuable mineral particles suspended in the froth are recovered from the tank as a mineral concentrate. The gangue particles remaining suspended in the slurry, along with those mineral particles that were not removed by flotation, are continuously discharged from the tank through a bottom outlet or other tails outlets.

One type of flotation device developed by the applicant for a grinding circuit is a skim air flotation device or cell, which receives the underflow stream from a cyclone device and recovers liberated valuable minerals from the recirculating load or feed stream. The skim air flotation cell uses a mechanical agitator, in the form of a rotor housed within a stator, normally disposed within the tank and driven by a motor and drive shaft, to agitate the slurry. An aeration system is also provided to direct air under pressure into the agitator through a central conduit formed within the drive shaft. Typically, the solids in the skim air are suspended using the agitator that also disperses the air into fine bubbles within the confines of the cell tank. These bubbles are typically in the range of 1 to 2 mm in size. The feed solids are fed at an inclined angle into the lower section of the flotation device so that the top half of the flotation device remains relatively quiescent and at a much lower pulp density than in the bottom half of the flotation cell.

The grinding circuit operates hydrocyclones which separate the mineral particles by centrifugal force and not by size. Hence, heavier minerals tend to build up in the grinding circuit and will be ground much finer if the skim air flotation cell does not recover them. At present, the skim air flotation cell is limited to recovering liberated valuable mineral particles in the normal range of flotation, typically in the very fast floating range of 38 to 106 microns. This means that the recovery of valuable mineral particles reduces as the particle size increases above 106 microns.

The primary aim of the skim air flotation cell is to remove these fast floating valuable particles and produce a concentrate that is capable of being cleaned to "final grade". This is often achieved by using a dedicated flash cleaner cell that re-treats the rougher concentrate from the skim air flotation cell to produce a final grade concentrate. A flash flotation circuit may treat about 40 to 50% of the recirculating load so it sees a lot more of the valuable material in the recirculating load stream compared to a gravity device or hydrofloat device operating off a bleed stream from the mill discharge hopper, which must be initially pre-screened. Thus, the amount of valuable mineral particles recovered in a skim air flotation cell can be significantly higher. The residence time in a skim air flotation cell is relatively short and is not normally longer than 2 to 4 minutes. This is usually adequate as the skim air flotation cell is recovering the very fast floating liberated valuable particles in the 38 to 106 micron range.

Another type of flotation device, called a "hydrofloat", may also be used for a grinding circuit to recover coarse valuable particles from the slurry. The hydrofloat is typically used to recover industrial minerals, such as phosphates, potash, graphite, coal, silica and iron ore sands, having a coarse size range up to 2 to 3 mm in size. The hydrofloat device has no moving parts or agitator, unlike the skim air flotation cell or other mechanical flotation devices and the like. Instead, the hydrofloat device operates primarily by forming a fluidised bed or teeter bed. A pump that supplies process water to the hydrofloat device uses a device to produce cavitations and fine microbubbles in the range of 0.2 to 0.5 mm in diameter, the microbubbles attaching to solid particles in the hydrofloat device. The fluidised bed is maintained by having air bubbles added in the range of 1 to 2 mm in size and these bubbles can attach themselves to the microbubbles already on the surfaces of the valuable mineral surfaces. The bubbles, microbubbles and attached solid particles then slowly rise up through the teeter bed because of their added buoyancy and overflow the hydrofloat device into a collection launder. The tails or rejects discharge from a conically shaped bottom of the device.

A typical hydrofloat device is 3 metres in diameter and has a water flow rate of 150 $m^3$/hr of water, thus requiring its pump to draw 150 kW of power (i.e. 1 kW/$m^3$). Hence, one disadvantage of a hydrofloat device is that it uses a substantial amount of energy to operate and is well within the typical range of power used by mechanical flotation devices even though it operates without a mechanical agitator. The hydrofloat device is also limited in that it can only accept a narrow range of particles so the feed material or slurry must be screened beforehand so as to only be in the range of 0.3 to 3.0 mm. In contrast, a skim air flotation cell can accept feed material or slurry up to 25 mm in size and hence requires no screening of the feed prior to treatment.

It is an object of the present invention to overcome or ameliorate at least one of the disadvantages of the prior art, or to provide a useful alternative. It is also an object of the present invention in one preferred form to provide a method and apparatus for treating a feed stream of a flotation device so that it can process feed material of up to 25 mm in size and recover valuable solids particles larger in size than particles in the very fast flotation range.

SUMMARY OF THE INVENTION

A first aspect of the present invention provides a method of treating a feed stream for a flotation device comprising a mechanical agitator in a tank, said feed stream comprising solid particles, said method comprising:

feeding a dilution water stream into said feed stream, and fluidly connecting said feed stream to said flotation device, and generating microbubbles in said dilution water stream;

mixing said dilution water stream with said feed stream to facilitate attachment of said microbubbles to said solid particles in said feed stream and generate bubbles for attachment to microbubble-attached solid particles.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Throughout this specification unless explicitly stated otherwise, the term "microbubbles" means in this specification gas or air bubbles having a diameter <0.5 mm (500 microns). Also, throughout this specification unless explicitly stated otherwise, the term "froth" means bubbles or foam, including any agglomeration of thereof, and the term "frother reagent" means any chemical substance which encourages the production of froth, bubbles or foam, including any agglomeration of thereof, in a fluid or liquid. Likewise, throughout this specification unless explicitly stated otherwise, the term "collector reagent" means any chemical substance which encourages a mineral particle to exhibit hydrophobic properties.

Preferably, said microbubble generating step comprises directing said microbubbles into said dilution water stream. More preferably, said microbubble generating step comprises directing said microbubbles in a direction substantially parallel to a flow direction of fluid in said dilution water stream.

Preferably, said microbubble generating step comprises injecting said microbubbles into said dilution water stream.

Preferably, said microbubble generating step comprises generating said microbubbles using air or a chemically inert gas. In one preferred form, said chemically inert gas comprises nitrogen or a nitrogen-enriched gas. In another preferred form, said chemically inert gas comprises helium. In a further preferred form, said chemically inert gas comprises an oxygen-deprived gas.

Preferably, said mixing step comprises directing said dilution water stream in a direction substantially perpendicular to a flow direction of said feed stream. More preferably, said mixing step comprises creating a turbulent region to mix said dilution water stream and said feed stream, thereby facilitating said attachment of said microbubbles to said solid particles and said generation of said bubbles for attachment to microbubble-attached solid particles.

Preferably, said method further comprises directing said feed stream to flow under gravity to entrain a gas into said feed stream to promote the generation of said bubbles in said mixing step. More preferably, said gas comprises air or a chemically inert gas. In one preferred form, said chemically inert gas comprises nitrogen or a nitrogen-enriched gas. In another preferred form, said chemically inert gas comprises helium. In a further preferred form, said chemically inert gas comprises an oxygen-deprived gas.

Preferably, said method further comprises adding reagents into said dilution water stream before fluidly connecting said dilution water stream to said feed stream. More preferably, said reagent adding step comprises adding frother reagents to said dilution water stream. In one preferred form, said reagent adding step comprises adding said frother reagents upstream of said microbubble generating step.

Alternatively or additionally, said reagent adding step comprises adding collector reagents to said dilution water stream. In one preferred form, said reagent adding step comprises adding said collector reagents downstream of said microbubble generating step.

Preferably, said flotation device comprises a skim air flotation cell or a tank cell.

A second aspect of the invention provides apparatus for treating a feed stream for a flotation device comprising a mechanical agitator in a tank, said feed stream comprising solids particles, said apparatus comprising;

a feed stream conduit fluidly connected to said flotation device for delivering said feed stream to said flotation device;

a dilution water stream conduit for conveying a dilution water stream to said feed stream, and a microbubble generator connected to said dilution water stream conduit for generating microbubbles in said dilution water stream, wherein said dilution water stream conduit is fluidly connected to said feed stream conduit to mix said feed stream and said dilution water stream so as to facilitate attachment of said microbubbles to said solid particles in said feed stream and generate bubbles for attachment to microbubble-attached solid particles.

Preferably, said microbubble generator extends at least partially within said dilution water stream conduit to direct said microbubbles into said dilution water stream. More preferably, said microbubble generator directs said microbubbles in a substantially parallel direction to a flow direction of said dilution water stream in said dilution water stream conduit. In one preferred form, said microbubble generator comprises a tubular body having a longitudinal axis and an outlet, said longitudinal axis of said tubular body being substantially parallel to a longitudinal axis of said dilution water stream conduit.

Preferably, said microbubble generator is fluidly connected to an air source or a gas source to generate said microbubbles. More preferably, said gas source provides a chemically inert gas to said microbubble generator. In one preferred form, said chemically inert gas comprises nitrogen or a nitrogen-enriched gas. In another preferred form, said chemically inert gas comprises helium. In a further preferred form, said chemically inert gas comprises an oxygen-deprived gas.

Preferably, said dilution water stream conduit directs said dilution water stream into said feed stream conduit at a substantially perpendicular direction to a flow direction of said feed stream in said feed stream conduit so as to create a turbulent region for mixing said dilution water stream and said feed stream, thereby facilitating said attachment of said microbubbles to said solid particles and said generation of bubbles for attachment to microbubble-attached solid particles.

Preferably, said feed stream conduit partly conveys said feed stream under gravity to entrain a gas into said feed stream so as to promote the generation of said bubbles. More preferably, said gas comprises air or a chemically inert gas. In one preferred form, said chemically inert gas comprises nitrogen or a nitrogen-enriched gas. In another preferred form, said chemically inert gas comprises helium. In a further preferred form, said chemically inert gas comprises an oxygen-deprived gas.

Preferably, said dilution water stream conduit further comprises one or more reagent inlets for adding reagents into said dilution water stream. More preferably, at least one of said reagent inlets is a frother reagent inlet for adding frother reagents to said dilution water stream. In one preferred form, said frother reagent inlet is located upstream of said microbubble generator.

Alternatively or additionally, at least one of said reagent inlets is preferably a collector reagent inlet for adding collector reagents to said dilution water stream. More preferably, said collector reagent inlet is located downstream of said microbubble generator.

Preferably, said microbubble generator comprises an air sparge, a fluid injector or a cavitation tube and pump assembly. In one preferred form, said microbubble generator comprises a plurality of said air sparges, said fluid injectors or said cavitation tube and pump assemblies.

A third aspect of the present invention provides a flotation device comprising the apparatus of the first aspect of the invention, a tank for receiving said feed stream from said feed stream conduit and a mechanical agitator for agitating said feed stream in said tank. More preferably, said mechanical agitator comprises a rotor and a stator. Alternatively, said mechanical agitator comprises a laminar flow mixer.

DESCRIPTION OF THE DRAWINGS

Preferred embodiments of the invention will now be described, by way of example only, with reference to the drawing as follows.

PREFERRED EMBODIMENTS OF THE INVENTION

Figure 1:
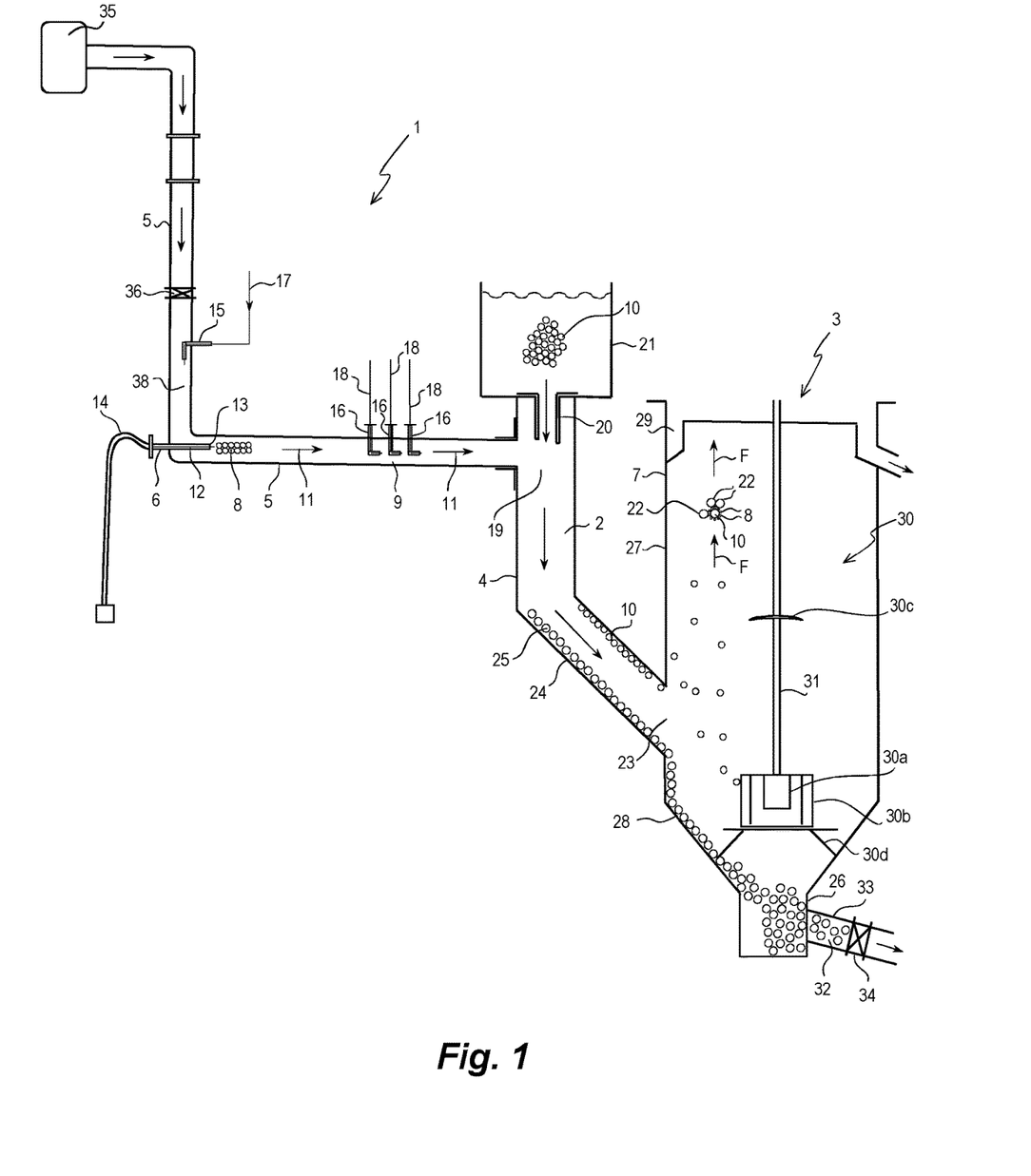
FIG. 1 is a schematic side view of an apparatus in accordance with one embodiment of the invention connected to a flotation device.

Referring to FIG. 1, a preferred embodiment of the invention is illustrated. The apparatus 1 for treating a feed stream 2 for a flotation device in the form of a skim air flotation cell 3 comprises a feed stream conduit in the form of a feed pipe 4, a fluid stream conduit in the form of a dilution water pipe 5 and a microbubble generator in the form of an air sparge 6 connected to the dilution water pipe. The feed pipe 4 is fluidly connected to the flotation cell 3 for delivering the feed stream 2 to a tank 7 of the flotation cell. The air sparge 6 generates microbubbles 8 (not to scale in FIG. 1) in a dilution water stream 9 that is being conveyed by the dilution water pipe 5. The dilution water pipe 5 is fluidly connected to the feed pipe 4 to facilitate attachment of the microbubbles 8 to solid particles 10 (not to scale in FIG. 1) in the feed stream 2, which generally comprises a slurry or mixture of solid particles suspended in a fluid, such as water. The solid particles 10 targeted by the microbubbles are relatively coarse solid particles (>106 microns) of valuable minerals, such as gold, copper and molybdenum. The generation of microbubbles 8 in the dilution water stream 9 ensures that there are sufficient microbubbles that come into contact with the solids particles 10 when the dilution water stream 9 is conveyed to the feed stream 2.

In the preferred embodiment, the air sparge 6 extends partially within the dilution water pipe 5 to direct the microbubbles 8 in a particular direction into the dilution water stream 9. In other embodiments, the air sparge 6 or other microbubble generator need only have its connections located at a sidewall of the dilution water pipe 5. That is, the microbubble generator does not need to extend into the dilution water pipe 5.

Also, the air sparge 6 preferably injects the microbubbles into the dilution water stream 9. This assists in entraining the microbubbles 8 into the dilution water stream 9. Furthermore, the air sparge 6 injects the microbubbles 8 in a direction substantially parallel to the flow direction 11 of the dilution water stream 9. In this embodiment, this is achieved by aligning the air sparge 6 with the dilution water pipe 5. That is, the air sparge 6 has a tubular body 12 and an outlet 13, the tubular body having a longitudinal axis that is substantially parallel to the longitudinal axis of the dilution water pipe 5 where the air sparge 6 is located. The air sparge 6 generates the microbubbles 8 using pressurised air from an air supply pipe 14.

The apparatus 1 also includes reagent inlets 15, 16 located at selected points of the dilution water pipe 5. The reagent inlet in the form of a Venturi pipe 15 delivers frother reagents into the dilution water stream 9 from a frother reagent line 17. The frother reagents in the dilution water facilitates microbubble formation and also reduces the surface tension of the microbubbles created by the air sparge 6, preventing the microbubbles 8 from merging or coalescing into larger bubbles once they enter the feed pipe 4. To maximise the effect of the frother reagents, in the embodiment, the frother Venturi pipe 15 delivers the frother reagents upstream of the air sparge 6 so as to prime the dilution water stream for microbubble generation.

The reagent inlets in the form of Venturi pipes 16 deliver collector reagents by gravity into the dilution water stream 9 from respective collector reagent lines 18. The Venturi pipes 16 will also induce some air into the dilution water stream 9 as a result of the negative pressure developed by the Venturi pipe, so this air will be dispersed into fine bubbles in the normal flotation range of 1 to 2 mm in size. The collector reagents facilitate making the solid particles 10 hydrophobic when the dilution water containing the collector reagents contacts the feed stream. In the embodiment, the collector Venturi pipes 16 are located downstream of the air sparge 6. Hence, the collector reagents will be thoroughly mixed into the dilution water stream 9 when it arrives at the feed pipe 4.

Figure 2:
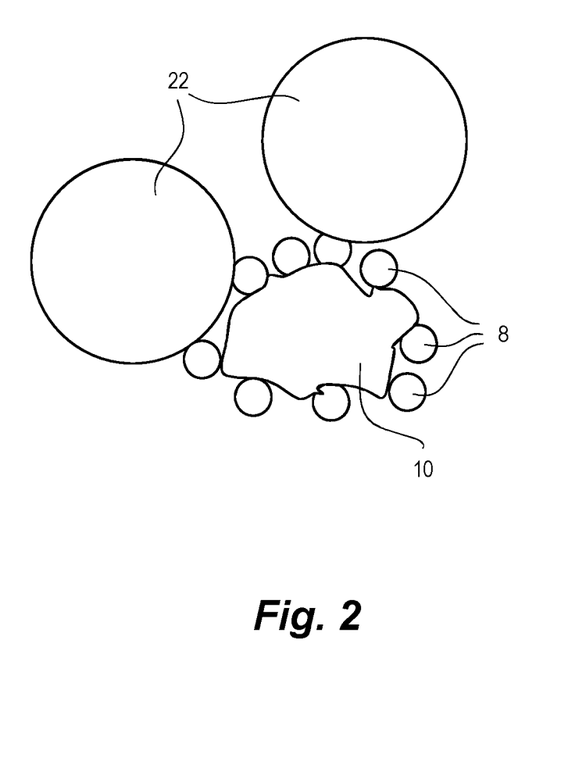
FIG. 2 is a schematic drawing illustrating attachment of microbubbles to solid particles and subsequent attachment of bubbles to the microbubble attached solid particles.

The dilution water stream 9 containing the microbubbles 8 is then fed by the dilution water pipe 5 into the feed stream 2 through a connection to the feed pipe 4. In the embodiment, the dilution water pipe 5 is connected to the feed pipe 4 so as to deliver the dilution water stream 9 in a direction substantially perpendicular to the direction of flow of the feed stream 2 in the feed pipe 4. This produces a turbulent region or zone 19, as best shown in FIG. 1. The turbulent zone 19 provides an area for mixing the dilution water stream 9 (containing microbubbles 8, frother reagents and collector reagents) with the feed stream 2, thereby facilitating attachment of the microbubbles 8 to the solid particles 10 in the feed stream. That is, when the microbubbles 8 reach the feed pipe 4, they are discharged with the dilution water stream 9 at a significant velocity to mix violently with the incoming feed stream 2 discharging from an outlet in the form of a feed orifice plate 20 of a feed box 21 fluidly connected to the feed pipe 4. The feed stream 2 has some air entrained with the slurry due to being fed from the outlet 20 into the feed pipe 4 under gravity. In this turbulent zone 19, there is high turbulence so the water breaks up the high density slurry and mixes the solids, water and air together. In this short time frame there are both microbubbles 8 and coarser or larger bubbles 22 present in the slurry as it gravitates down the feed pipe 4 by gravity and into the skim air flotation cell 3. Hence, there is natural contact between the microbubbles 8, solid particles 10 and bubbles 22 in this region of low turbulence as the initial high turbulence has fully dissipated. In these few seconds before the solids and dilution water enter the skim air flotation cell 3, the microbubbles 8 attach themselves to the valuable mineral solid particles 10 and then larger bubbles 22 also attach themselves onto the microbubbles 8, as best shown in FIG. 2. Due to their increased buoyancy from the attached microbubbles 8 and bubbles 22, the bubble-microbubble-attached solid particles 10 begin to rise upwards to the surface of the tank 7 and overflow into the concentrate launder.

After passing through the turbulent zone 19, the feed stream 2 (now having microbubbles 8 attached to the solid particles 10, as well as larger bubbles 22 attached) enters the flotation cell tank 7 via a feed inlet 23, where it undergoes the flotation process. The feed pipe 4 has an angled portion 24 that assists in separating the relatively coarse or dense solid particles 25 (not to scale in FIG. 1) from the microbubble-attached solid particles 10 as the feed stream 2 enters the flotation cell 3. Hence, as the solids continue to gravitate into the flotation cell 3 the relatively coarse material 25 segregates and drops to the bottom of the feed pipe 4 as it enters the cell.

The flotation cell tank 7 has a generally flat bottom discharge box 26 and a substantially cylindrical sidewall 27 extending upwardly from an angled wall 28 extending from the base. A peripheral overflow launder 29 extends around the inside top of the sidewall for removing mineral enriched froth as it floats to the surface.

An agitator 30 is disposed to agitate the slurry within the tank 7 via a centrally disposed drive shaft 31 extending axially downwardly into the tank and driven by a motor (not shown). The agitator 30 typically comprises a rotor 30*a* and a stator 30*b*, with an auxiliary agitator 30*c* located on the drive shaft 31 above the rotor 30*a*. The agitator 30 used in the preferred embodiment is described in more detail in the Applicant's PCT Publication No. WO 2004/082841, whose specification is hereby incorporated by reference. The stator 30*b* is supported by a stator base 30*d* which is connected to the angled tank wall 28. Advantageously, the auxiliary agitator 30*c* is used to boost the bubble-microbubble-attached coarse solid particles 10 up to the surface of the tank 7 where they can then be recovered into the launder 29. Since the relatively coarser or denser material 25 is being segregated towards the bottom of the feed pipe 4, the majority of this relatively coarse material bypasses the agitator 30 and reports to the tails stream 32 that is removed via an outlet 33 and a valve 34.

The bubble-microbubble-solid particle attachment process continues once the feed slurry enters the flotation cell 3. Thus, the valuable mineral solid particles 10 that are attached to microbubbles 8 that have not already attached to larger bubbles in the feed pipe 4 can be attached to the larger air bubbles 22 in the tank 7. Once the larger bubbles 22 attach to the microbubbles 8 that are already attached to the solids particles 10, either just before entering the tank 7 or within the tank, the added or increased buoyancy of the mineral solid particles causes them to rise up towards the top of the flotation cell 3, as shown by arrows F in FIG. 1. The skim air flotation cell 3 operates with a near zero froth depth, unlike flotation devices employing a mechanical agitator, so that the targeted solids particles 10 have a chance to be recovered directly into the launder 29 and not be potentially lost if there was a deep froth zone formed where coarse particles will readily detach. In practice, the froth surface is about 0 to 25 mm in depth, but should be very shallow and some slurry will overflow at times into the launder 29. Hence, the coarser solid particles do not drop back into the pulp zone as they are aided by the added buoyancy of the air bubbles plus the upward fluid velocity of the slurry provided by the auxiliary agitator 30*c*. This does mean that some fine slurry will overflow at times into the launder 29 together with the valuable mineral solid particles 10, thus acting like a skimmer where both froth and some slurry overflow into the collection launder. Hence, the concentrate produced will need further downstream processing.

The dilution water pipe 5 is connected to a dilution water source 35 and delivers the dilution water under pressure. There is also an automatic control valve 36 with a flow meter (not shown) to control the flow of the dilution water so that is has sufficient velocity and turbulence to mix the frother reagent prior to the dilution water reaching the air sparge 6

While the preferred embodiment of the invention uses dilution water from a thickener, clarifier or other separation device as the fluid stream 9 added to the feed stream 2, it will be appreciated that other types of fluid can be used in the invention. For example, the fluid can be process water, pure water, water sourced from a settling pond and other liquids incorporating particles or other impurities.

In another preferred embodiment, the dilution water stream 9 can be fed at an angle to the flow direction of the feed stream 2, such as connecting the dilution water pipe 5 at an angle to the feed pipe 4, and still produce a turbulent zone 19 for mixing.

Also, in a further preferred embodiment, there is more than one frother reagent inlet. Similarly, there can be a single collector reagent inlet instead of the multiple collector reagent inlets shown in FIGS. 1 and 3. It will be appreciated that while the respective frother reagent and collector reagent inlets are illustrated in their optimal locations at the fluid stream conduit in FIGS. 1 and 3, they can be located elsewhere on the fluid stream conduit, so long as before the fluid stream 9 mixes with the feed stream 2.

In yet another preferred embodiment, the flotation cell 3 uses a different type of mechanical agitator to the agitator 30. For example, the agitator can have a rotor 30*a* and stator 30*b* without an auxiliary agitator 30*d*. In another example illustrated in FIG. 3, where corresponding features have been given the same reference numerals, the agitator 50 is a laminar flow mixer, such as an airfoil impeller. Aside from this difference and the type of microbubble generator discussed in more detail below, in all other respects, this embodiment is substantially the same as the embodiment of FIG. 1, and thus works in substantially the same manner.

Figure 3:
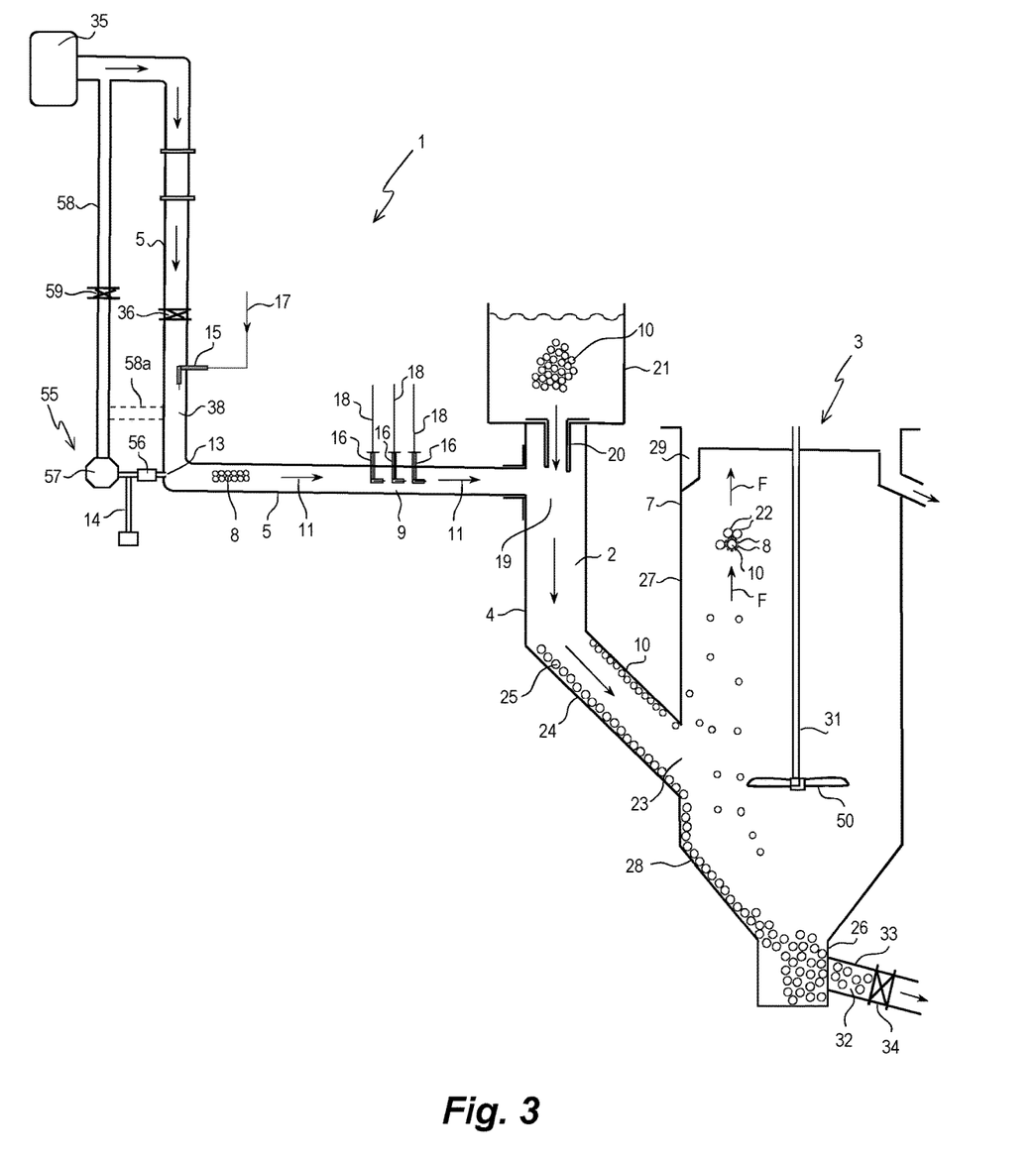
FIG. 3 is a schematic side view of the apparatus of FIG. 1 connected to a different type of flotation device.

In other preferred forms or embodiments, the microbubble generator is a fluid injector other than an air sparge. For example, the microbubble generator comprises a cavitation tube and pump assembly, which creates cavitations in a fluid medium to generate the microbubbles. Referring to FIG. 3, the microbubble generator in this embodiment is a cavitation tube and pump assembly 55, comprising a cavitation tube 56 and pump 57 that receives dilution water from a branch pipe 58 fluidly connected to the dilution water pipe 5. An automatic control valve 59 with a flow meter (not shown) controls the flow of dilution water in the branch line 58 to the cavitation tube and pump assembly 59. Pressurised gas or air is added to the discharge of the pump 57 via air supply pipe 14. The dilution water-air mixture is pumped into the cavitation tube 56 that generates and discharges the microbubbles 8 via the outlet 13 into the dilution water pipe 5. In this embodiment, the outlet 13 is located at the sidewall of the dilution water pipe 5 and does not extend into the dilution water pipe.

In a further variation of this embodiment, the branch line 58a is located downstream of the control valve 36, and preferably downstream of the frother reagent inlet 15, as shown in dashed lines in FIG. 3. It is contemplated that using branch line 58a makes the cavitation and pump assembly 55 more suitable for retrofitting to existing pipe work connected to the flotation cell 3. It also has the advantage of being less expensive to implement.

Also, in other embodiments there is a plurality of the microbubble generators. The microbubble generators can be fluidly separated from each other or fluidly connected by suitable piping and/or a manifold.

While the preferred embodiments of the invention have been described as using air to create the microbubbles 8 and air bubbles 22, it will be appreciated that a gas may be used instead of air. For example, a chemically inert gas can be supplied to the air sparge 5 or cavitation tube and pump assembly 55 in FIGS. 1 and 3, respectively. Likewise, the feed box 21 can be enclosed to exclude air and be in fluid communication with a gas source to receive a chemically inert gas with the feed slurry. The use of a chemically inert gas is advantageous where the targeted solid particles are susceptible to a chemical reaction with air, such as gold and molybdenite particles. For gold and molybdenite particles, the oxygen contained in the air can cause oxidation of their respective outer surfaces and hence prevent the solid particles from becoming hydrophobic and attaching to a bubble (or a microbubble). Instead, they often have ions precipitated onto their surfaces that make them hydrophilic and repel bubbles. As such, using a chemically inert gas like nitrogen, helium or a nitrogen-enriched gas would avoid this problem which could inhibit the attachment of microbubbles to the solid particles and attachment of bubbles to microbubble-attached solid particles. The chemically inert gas may also be an oxygen-deprived gas; that is, any gas where oxygen has been removed or substantially removed. Thus, the flotation recovery rate of solid particles susceptible to chemically reacting with air, such as gold particles and molybdenite particles, can be significantly increased by using a chemically inert gas to generate the microbubbles and/or bubbles.

It will further be appreciated that any of the features in the preferred embodiments of the invention can be combined together and are not necessarily applied in isolation from each other. For example, the feature of the microbubble generator being a cavitation tube and pump assembly and the feature of an angled feed pipe can be combined into a single apparatus. Similar combinations of two or more features from the above described embodiments or preferred forms of the invention can be readily made by one skilled in the art.

By treating a fluid stream with microbubbles before being added to the feed stream, the invention increases the probability of attachment of bubbles to valuable mineral particles and hence the efficiency of the flotation process is significantly improved. As a consequence, a greater proportion of mineral particles can be recovered in the flotation device, as well as coarser but valuable mineral particles that would not ordinarily be recovered in convention flotation, being particles greater than 106 microns in diameter.

The improved recovery of these coarser particles also applies to coarser mineral particles that are not fully liberated (that is, a fully liberated particles is a mineral particle that contains no gangue constituents) and considered to be composite particles (that is, valuable mineral particles that are not fully liberated from the ore matrix at the hydrocyclone cut point so they contain other gangue minerals, which can be from 5% liberated/95% gangue to 95% liberated/5% gangue—the extent of the available liberated surface area of a valuable mineral composite particle will determine whether an air bubble can successfully attach itself).

Since there is relatively no froth zone at the top of the flotation device, the invention advantageously reduces drop back or drop off of the coarse particles back into the flotation device tank. In addition, the coarse concentrate obtained from the overflow launder can be treated in a regrind circuit and re-treated so as to increase the overall recovery rate of the valuable minerals from the grinding circuit and hence the plant. Moreover, the invention advantageously uses relatively little energy compared to a hydrofloat device. The invention could also potentially allow the particle size cut point of the hydrocyclones (P80) to be increased so that the power consumption in the grinding circuit can be significantly reduced.

Thus, with the apparatus and method of the invention, it is possible for a flotation device, such as a skim air flotation cell to recover coarser valuable particles such as free gold, nickel and copper, as well as composite valuable particles. The apparatus and method of the invention can also improve the recovery of slabby and thinly shaped valuable minerals such as molybdenum found in molybdenum disulphide. Moreover, the invention provides a more energy efficient and less expensive way of adding microbubbles to solid particles, since the generation of microbubbles in a fluid stream for subsequent mixing with the feed stream obviates the need for associated equipment to be provided for the flotation tank. Hence, there is less wear, maintenance and operational downtime, while retaining the advantages of improved recovery of both fine and coarse mineral particles in the flotation device not previously achievable. Furthermore, the flotation device is of the type that uses a mechanical agitator and so does not require the feed stream to be screened to a smaller range of particle size before entering the flotation device, unlike a hydrofloat device. The invention also provides a much simpler design to implement in a flotation device and permits retrofitting to existing flotation devices. In all these respects, the invention represents a practical and commercially significant improvement over the prior art.

While the invention has been described with reference to a skim air flotation cell, it will be appreciated that the same principles may be applied to other flotation devices, such as flash flotation devices, tank cells, flotation cells employing mechanical agitators and the like. Moreover, although the invention has been described with reference to specific examples, it will be appreciated by those skilled in the art that the invention may be embodied in many other forms.

The invention claimed is:

1. A method of treating a feed stream for a flotation device comprising a mechanical agitator in a tank, said feed stream comprising solid particles, said method comprising:

feeding a dilution water stream into said feed stream, and fluidly connecting said feed stream to said flotation device, and generating microbubbles in said dilution water stream, and mixing said dilution water stream with said feed stream to facilitate attachment of said microbubbles to said solid particles in said feed stream and generate bubbles for attachment to microbubble-attached solid particles.

2. The method of claim 1, wherein said microbubble generating step comprises directing said microbubbles into said dilution water stream.

3. The method of claim 1, wherein said microbubble generating step comprises injecting said microbubbles into said dilution water stream.

4. The method of claim 2, wherein said microbubble generating step comprises directing or injecting said microbubbles in a direction substantially parallel to a flow direction of said dilution water stream.

5. The method of claim 1, wherein said microbubble generating step comprises generating said microbubbles using air or a chemically inert gas.

6. The method of claim 5, wherein said chemically inert gas comprises at least one of nitrogen, helium, a nitrogen-enriched gas or an oxygen-deprived gas.

7. The method of claim 1, wherein said mixing step comprises directing said dilution water stream in a direction substantially perpendicular to a flow direction of said feed stream.

8. The method of claim 7, wherein said mixing step comprises creating a turbulent region to mix said dilution water stream and said feed stream, thereby facilitating said attachment of said microbubbles to said solid particles and said generation of said bubbles for attachment to microbubble-attached solid particles.

9. The method of claim 1, further comprising directing said feed stream to flow under gravity to entrain a gas into said feed stream to promote said generation of bubbles in said mixing step.

10. The method of claim 9, wherein said gas comprises air or a chemically inert gas.

11. The method of claim 10, wherein said chemically inert gas comprises at least one of nitrogen, helium, a nitrogen-enriched gas or an oxygen-deprived gas.

12. The method of claim 1, further comprising adding frother reagents into said dilution water stream upstream of said microbubble generating step before fluidly connecting said dilution water stream to said feed stream.

13. The method of claim 1, further comprising adding collector reagents into said dilution water stream downstream of said microbubble generating step before fluidly connecting said dilution water stream to said feed stream.

14. An apparatus for treating a feed stream for a flotation device comprising a mechanical agitator in a tank, said feed stream comprising solid particles, said apparatus comprising:
a feed stream conduit fluidly connected to said flotation device for delivering said feed stream to said flotation device, and
a dilution water stream conduit for conveying a dilution water stream to said feed stream, characterised in that said apparatus further comprises:
a microbubble generator connected to said dilution water stream conduit for generating microbubbles in said dilution water stream,
wherein said dilution water stream conduit is fluidly connected to said feed stream conduit to mix said feed stream and said dilution water stream so as to facilitate attachment of said microbubbles to said solid particles in said feed stream and generate bubbles for attachment to microbubble-attached solid particles.

15. The apparatus of claim 14, wherein said microbubble generator extends at least partially within said dilution water stream conduit to direct said microbubbles into said dilution water stream.

16. The apparatus of claim 14, wherein said microbubble generator directs said microbubbles in a substantially parallel direction to a flow direction of said dilution water stream in said dilution water stream conduit.

17. The apparatus of claim 16, wherein said microbubble generator comprises a tubular body having a longitudinal axis and an outlet, said longitudinal axis of said tubular body being substantially parallel to a longitudinal axis of said dilution water stream conduit.

18. The apparatus of claim 14, wherein said microbubble generator is fluidly connected to an air source or a gas source to generate said microbubbles, said gas source providing a chemically inert gas to said microbubble generator.

19. The apparatus of claim 14, wherein said dilution water stream conduit directs said dilution water stream into said feed stream conduit at a substantially perpendicular direction to a flow direction of said feed stream in said feed stream conduit so as to create a turbulent region for mixing said dilution water stream and said feed stream, thereby facilitating said attachment of said microbubbles to said solid particles and said generation of bubbles for attachment to microbubble-attached solid particles.

20. The apparatus of claim 14, wherein said feed stream conduit partly conveys said feed stream under gravity to entrain a gas into said feed stream so as to promote the generation of said bubbles.

21. The apparatus of claim 14, wherein said dilution water stream conduit further comprises one or more frother reagent inlets for adding frother reagents into said dilution water stream, wherein said one or more frother reagent inlets are located upstream of said microbubble generator.

22. The apparatus of claim 14, wherein said dilution water stream conduit further comprises one or more collector reagent inlets for adding collector reagents to said dilution water stream, wherein said one or more collector reagent inlets are downstream of said microbubble generator.

23. The apparatus of claim 14, wherein said microbubble generator comprises one or more air sparges.

24. The apparatus of claim 14, wherein said microbubble generator comprises one or more fluid injectors.

25. The apparatus of claim 14, wherein said microbubble generator comprises one or more cavitation tube and pump assemblies.

26. A flotation device comprising the apparatus of claim 14, a tank for receiving said feed stream from said feed stream conduit and a mechanical agitator for agitating said feed stream in said tank.

27. The flotation device of claim 26, wherein said mechanical agitator comprises a rotor and a stator.

28. The flotation device of claim 26, wherein said mechanical agitator comprises a laminar flow mixer.

* * * * *